Oct. 12, 1926.                                              1,602,772
A. MOORHOUSE
HYDROCARBON MOTOR
Filed Feb. 3, 1921        3 Sheets-Sheet 3
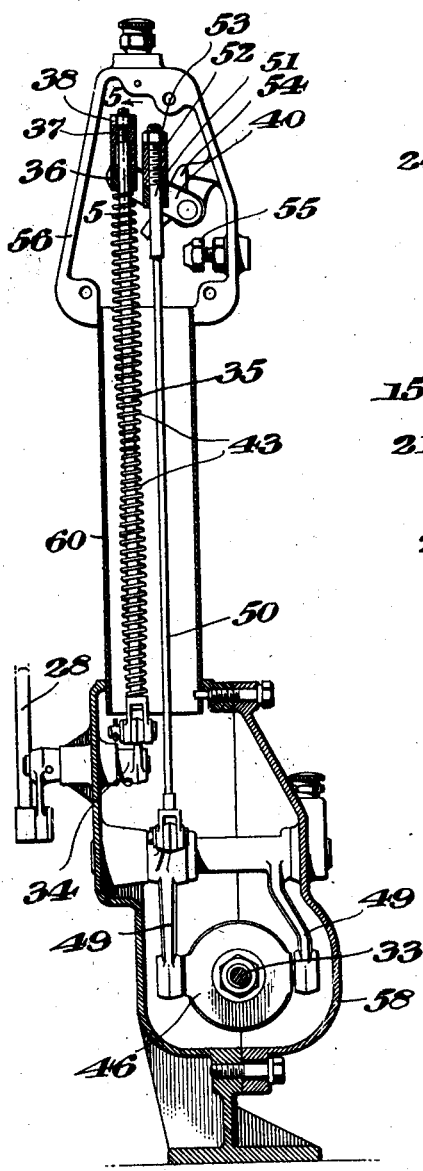
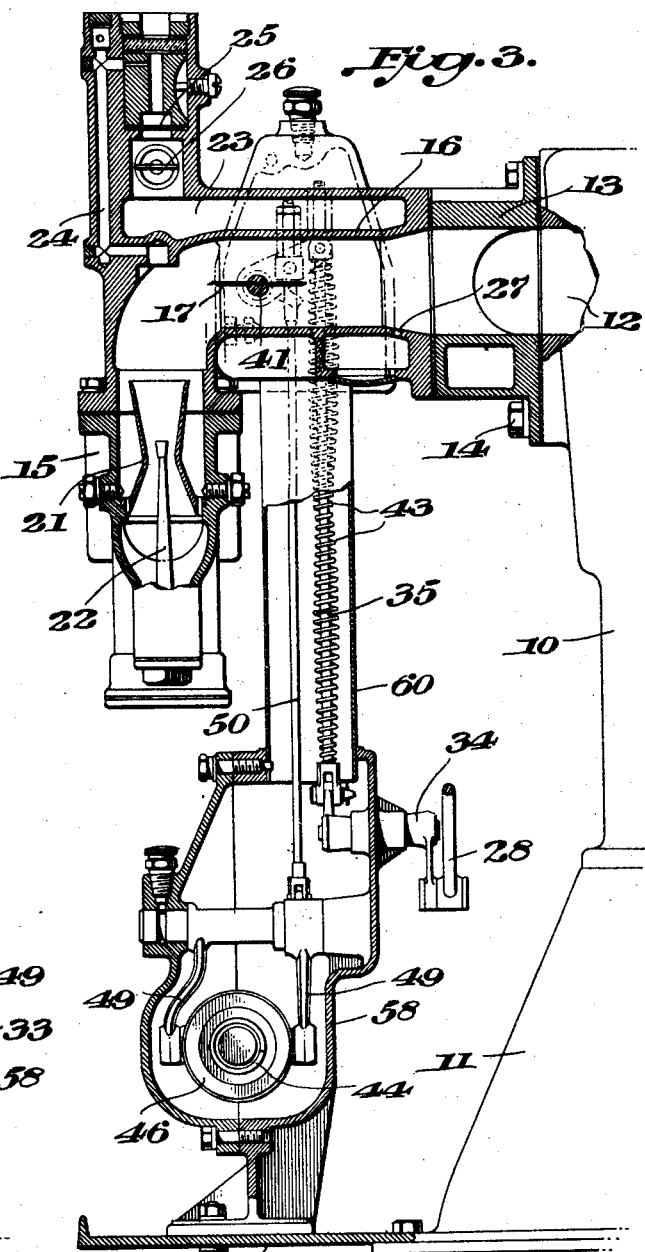
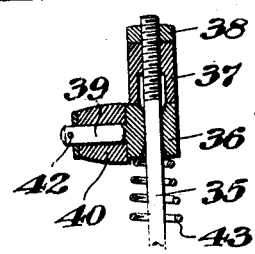
Inventor
Alfred Moorhouse
By Milton Tibbetts
Attorney Patented Oct. 12, 1926.

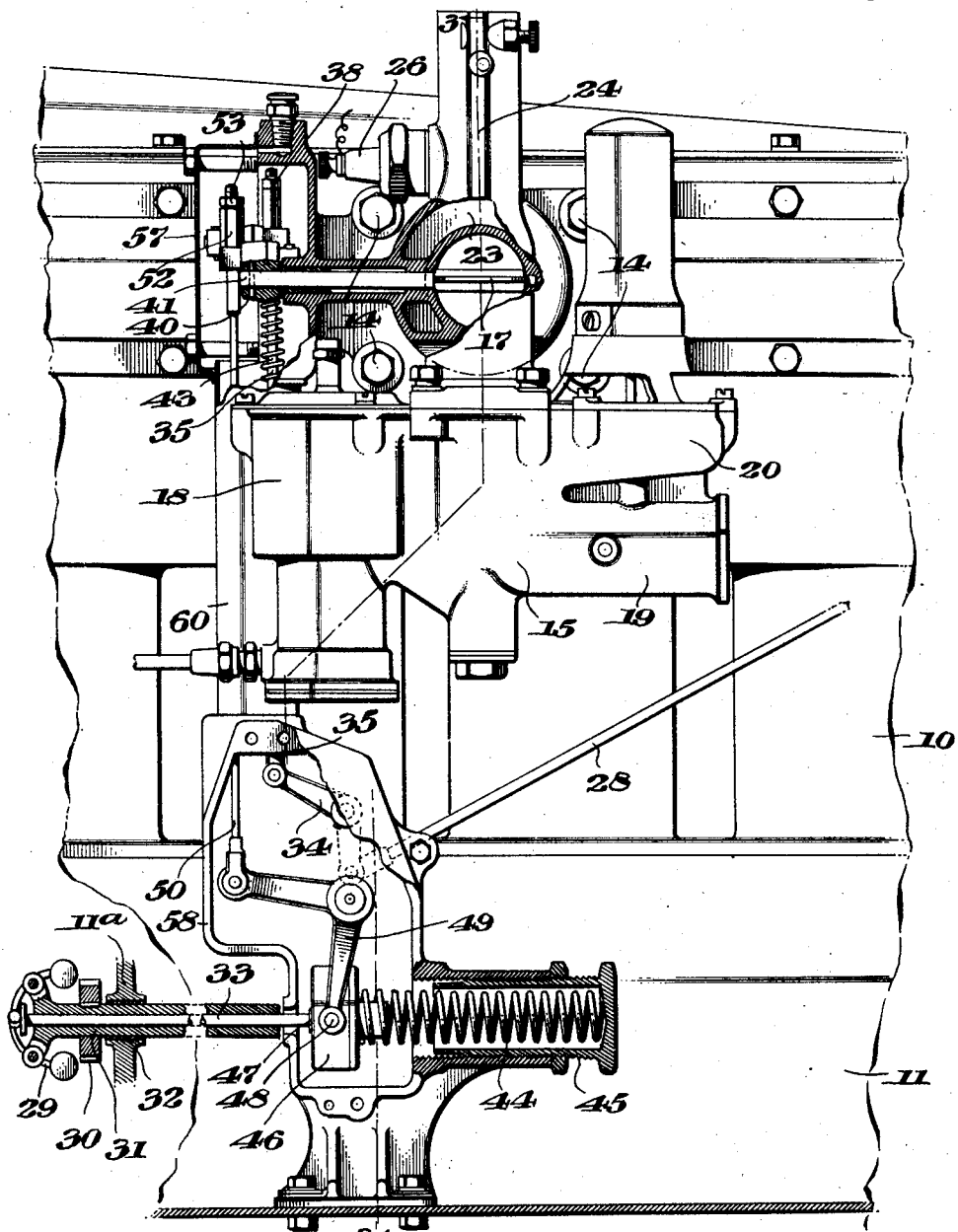

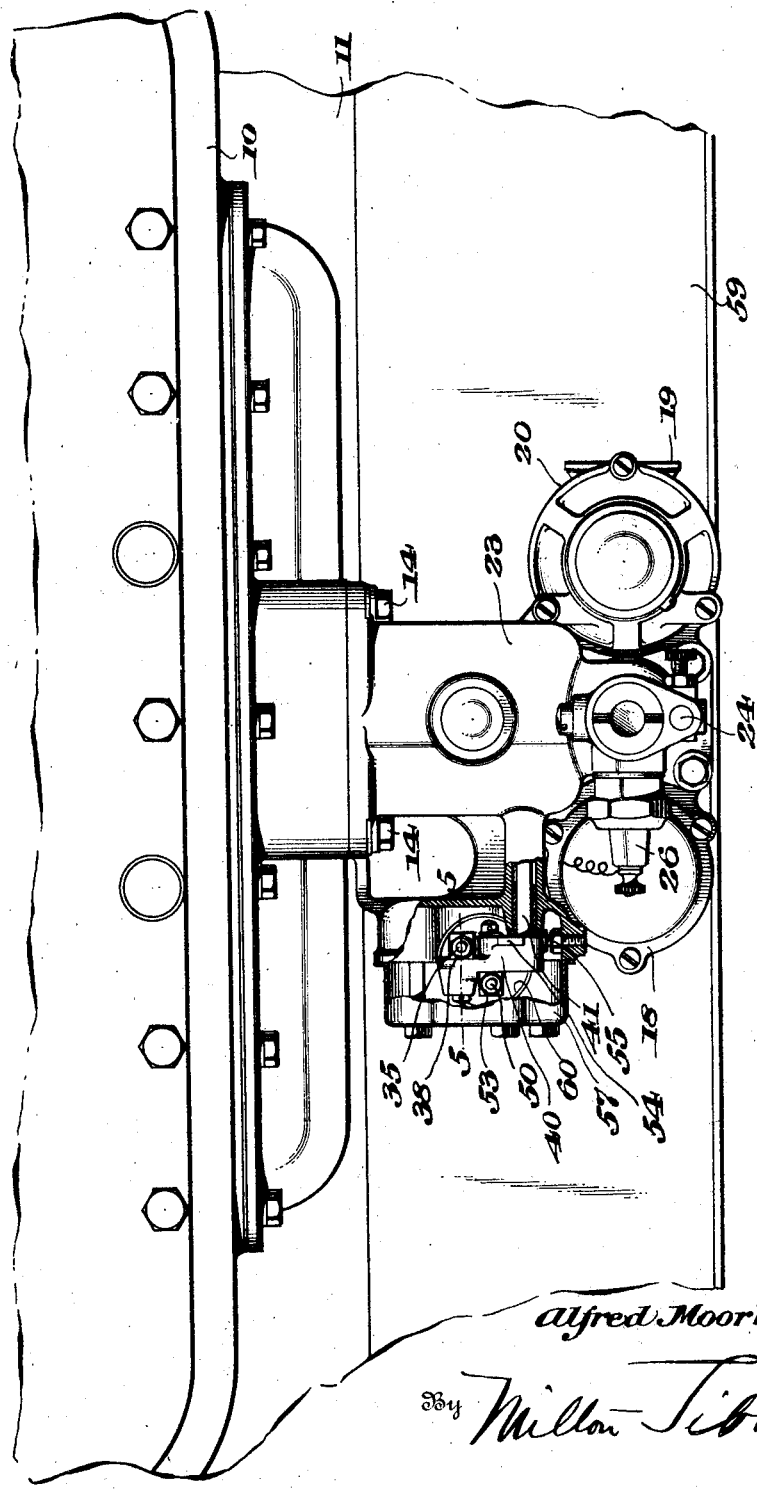

1,602,772

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed February 3, 1921. Serial No. 442,199.

This invention relates to hydrocarbon motors and particularly to the means for controlling the passage of mixture thereto.

One of the objects of the invention is to provide a simple and practicable means for operating a single throttle in the motor intake pipe both manually and by governor action so that the governor may always determine the maximum speed of the motor, while the speeds below maximum may be under accurate manual control.

Other objects of the invention will appear from the following description taken in connection with the drawings, which form a part of the specification, and in which:

Fig. 1 is a side elevation of part of a hydrocarbon motor embodying the invention;

Fig. 2 is a plan view of the motor shown in Fig. 1;

Fig. 3 is a vertical transverse section substantially on the line 3—3 of Fig. 1;

Fig. 4 is a vertical transverse section through the throttle operating devices looking in the opposite direction from that of Fig. 3; and Fig. 5 is a slightly enlarged detail section on the line 5—5 of Figs. 2 and 4.

Referring to the drawings, 10 indicates a cylinder block of a hydrocarbon motor and 11 is the crank case upon which the cylinder block is mounted. One of the intake conduits of the cylinder block is indicated at 12 and 13 is a manifold or intake pipe connected to the cylinder block as by bolts 14. A carburetor 15 is connected to the intake pipe 13 and its upper part 16 forms a continuation of the intake pipe. A throttle valve 17 is shown in this part of the intake pipe or conduit.

The carburetor 15 above referred to is of the well known "Packard" construction and comprises in general a float chamber 18, a main air intake 19, a valve controlled air intake 20, a Venturi mixing tube 21, shown particularly in Fig. 3, and a fuel nozzle 22 which of course is connected to be supplied with liquid fuel from the float chamber.

The carburetor or intake pipe is also supplied with a fuelizer for heating the mixture passing to the motor and this comprises a combustion or heating chamber 23 surrounding a part of the intake pipe, an intake passage 24 for mixture from the carburetor, a screen 25 for breaking up the mixture, a spark plug 26 for firing the charge, and an outlet port 27 which connects with the intake pipe beyond the throttle valve 17 so that there is a constant suction on the combustion chamber when said throttle valve is closed or nearly so.

When this type of engine is used in commercial vehicles it is desirable that the speed of the engine be governed so that the vehicle cannot be driven beyond a predetermined speed. Usually this is accomplished by the use of two throttle valves arranged in series in the intake pipe but in the present invention, with the use of the carburetor and fuelizer shown, it is not feasible to employ two throttle valves in the very short intake pipe that is employed. In the present invention therefore a single throttle valve 17 is used and both manual and governor operated means are employed for controlling this valve.

The manually operated rod for the motor vehicle is shown at 28, in Fig. 1, and it will be understood that this is usually connected to an accelerator pedal or to a hand lever, or both as may be desired. A governor driven by the motor is shown, somewhat diagrammatically, in the lower left-hand corner of Fig. 1, 29 indicating the governor and 30 the gear for driving it. The shaft 31 which the gear drives is mounted in a suitable bearing 32 in a portion of the crank case 11ª, and this shaft is drilled to receive a rod 33 which the governor actuates axially as the speed of the shaft increases.

As above indicated, both the manually operated device 28 and the governor 29 are connected to the throttle valve 17. As shown, the rod 28 is pivoted to one arm of a bell crank lever 34, the other arm of which is connected to a rod 35 which extends upwardly through a block 36 and into a nut 37 which is screw threaded on the end of the rod 35. A lock nut 38 is also threaded on the end of the rod 35 thus affording an adjustment and locking means between the nut 37 and the rod. The block 36 has a shank 39 shown particularly in Fig. 5, which shank is pivoted near the outer end of an arm 40 which is shown as pinned to the end of a shaft 41 upon which the throttle valve 17, above referred to, is mounted. A cotter pin or other locking means 42 is shown in Fig. 5 as retaining the block 36 in place.

It will be understood that the rod 35 extends loosely through the block 36 so that the arm 40 may move downwardly from the position in which it is shown in Figs. 1, 3 and 4 without moving the rod 35. A spring 43, however, (or two springs as shown in the drawings for better manufacturing reasons) surrounds the rod 35 and extends from its lower to the block 36 so that the arm 40 in moving downwardly, as above suggested, slightly compresses the spring 43. The spring, however, is very long and its tension is only slightly increased by this downward movement of the arm 40 and as the throttle valve 17 moves very easily in the intake pipe, the tension of the spring is sufficient to move the arm 40 upwardly unless other forces intervene. Thus it will be seen that the manually operated rod 28 may readily position the valve 17 unless the latter is set by the governor as hereinafter described. It will be seen also that the spring device 43 above described will act to yieldingly retain the throttle valve 17 in open position as long as the manually operated device 28 is in the position shown in the drawings.

The governor 29 above referred to is retained in its inoperative position by a spring 44 which is adjustable as by a socket nut 45. The spring 44 bears against a block 46, which in turn bears against the end 47 of the rod 33 above described. The block 46 has trunnions 48 for one of the arms of a bell crank lever 49, the other arm of which is connected to a rod 50 which extends upwardly to the arm 40 of the throttle valve to which arm it is connected as is the rod 35, except that there is no spring surrounding the rod 50. Thus the rod 50 extends through a block 51 which is trunnioned in the arm 40 in the same manner as is the block 36 above described, and a nut 52 and lock nut 53 provide adjustment for the rod 50 relative to the arm 40. The block 51 is pivoted in the arm 40 somewhat nearer the shaft 41 so that a lesser movement of the rod 50 is required to operate the throttle valve. The arm 40 has a rigid stop 54 for determining the open position of the throttle valve, and an adjustable stop 55 determines the closed position so that it may be set for idling the motor.

It will be understood that the governor connections to the throttle valve permit of the arm 40 being moved downwardly from the position shown in Figs. 1, 3 and 4 without moving the rod 50, as when the manually operated device closes the throttle. Also, the governor may through these connections close the throttle valve against the action of the spring device 43 without moving the rod 35, that is, without shifting the manual control.

The above connections permit the governor to absolutely control the speed of the motor, except that the manual control may close the throttle more than it is for the time being closed by the governor connections. In other words, manual control is limited to control of the motor below the speed determined by the governor.

Of course the above statement is qualified to the extent that the spring device 43 may affect the action of the governor but because of the use of a very long spring as shown, there is no practical effect produced upon the action of the governor by moving the bell crank lever 34 from one of its extreme positions to the other.

The arm 40 and the upper ends of the rods 35 and 50 are enclosed in a casing 56 and its cover 57. The bell cranks 34 and 49 and associated parts are enclosed in a casing 58 shown as mounted upon an extension 59 of the crank case 11. A tube 60 connects the casings 56 and 58 and encases the rods 35 and 50 so that all of these parts are enclosed, thus preventing tampering with the governor and the adjustments.

While I have herein described in some detail a specific embodiment of my invention, which I deem to be new and advantageous and may specifically claim, I do not desire to be understood that my invention is limited to the exact details of the construction, as it will be apparent that changes may be made therein without departure from the spirit or scope of my invention.

Having thus described my invention, what I desire and claim by Letters Patent is:

1. In a hydrocarbon motor having a throttle valve, the combination of manual means adapted to positively close the throttle valve including a sliding connection, spring means associated with the sliding connection to yieldingly retain the throttle valve in open position, and governor operated means to determine the maximum opening of said throttle valve.

2. In a hydrocarbon motor, the combination with the intake conduit and a throttle valve therein, of a manually operated rod, a sliding connection between the rod and said throttle valve so that it will move the throttle valve positively in one direction, a spring on said rod to yieldingly retain the valve in its open position, and a governor operated rod connected to said throttle valve to positively move it from open to closed position against said spring.

3. In a hydrocarbon motor, the combination with the throttle valve thereof, of a manually operated rod having a sliding connection to said throttle valve to positively move the valve towards closed position and yieldingly move the valve towards open position, and a governor operated device connected to said throttle valve to move said valve towards closed position in opposition to the yielding means of said manually operated connections.

4. In a hydrocarbon motor, the combination with the intake conduit and the throttle valve therein, of manually operated means for moving said throttle valve, connections from said means to said throttle valve to cause positive closing of the throttle valve by one movement of said means and yielding opening of said valve by the opposite movement of said means, a governor operated by the motor, and connections from said governor to said throttle valve to positively move the throttle valve towards closing position against the yielding part of said connections.

In testimony whereof I affix my signature.

ALFRED MOORHOUSE.